United States Patent
Wu

(10) Patent No.: US 8,168,937 B2
(45) Date of Patent: May 1, 2012

(54) OPTICAL HEAD FOR READING AN IMAGE OF AN OBJECT

(75) Inventor: Chih Mang Wu, Miaoli (TW)

(73) Assignee: Sunplus mMedia, Inc., Hsinchu Science Park (TW)

( * ) Notice: Subject to any disclaimer, the term of this patent is extended or adjusted under 35 U.S.C. 154(b) by 400 days.

(21) Appl. No.: 12/411,036

(22) Filed: Mar. 25, 2009

(65) Prior Publication Data

US 2010/0006747 A1    Jan. 14, 2010

(30) Foreign Application Priority Data

Jul. 10, 2008   (TW) ............................... 97126009 A

(51) Int. Cl.
*H01J 3/14* (2006.01)
(52) U.S. Cl. ........................................................ 250/216
(58) Field of Classification Search .................. 250/216; 235/454, 462.01, 462.42, 462.43, 472.01, 235/472.03; 3/216
See application file for complete search history.

(56) References Cited

U.S. PATENT DOCUMENTS

| 4,093,991 A | * | 6/1978 | Christie et al. | 356/319 |
| 4,731,649 A | * | 3/1988 | Chang et al. | 348/127 |
| 5,457,492 A | * | 10/1995 | Sasaki et al. | 348/126 |

* cited by examiner

*Primary Examiner* — Thanh X Luu
(74) *Attorney, Agent, or Firm* — Muncy, Geissler, Olds & Lowe, PLLC

(57) ABSTRACT

An optical head that can be easily assembled is for reading an image of an object and includes a housing, a diffuser, a light source module and a light sensing module. The diffuser is connected to the housing. The light source module has a substrate and a first light source mounted on a front side of the substrate. The front side of the substrate is fixed to an external surface of the diffuser. The first light source provides an initial light ray incident to the diffuser. The diffuser processes the initial light ray into uniform light for output. The light sensing module fixed in the housing senses reflected light, which is generated from the uniform light reflected by the object.

19 Claims, 3 Drawing Sheets

OPTICAL HEAD FOR READING AN IMAGE OF AN OBJECT

This application claims priority of No. 097126009 filed in Taiwan R.O.C. on Jul. 10, 2008 under 35 USC 119, the entire content of which is hereby incorporated by reference.

BACKGROUND OF THE INVENTION

1. Field of Invention

The invention relates to an optical head that can be easily assembled.

2. Related Art

FIG. 1 is a schematic illustration showing application of a conventional optical head 101. Referring to FIG. 1, the optical head 101 for reading an object 102 includes a hollow housing 110, a light source module 120 and a light sensing module 140. The light source module 120 is fixed in the hollow housing 110 and provides a light ray. The light ray is reflected in the hollow housing 110 and then illuminates the object 102. The light sensing module 140 fixed in the hollow housing 110 senses the light ray reflected by the object 102.

The light ray reflection may include specular reflection, spread reflection and diffuse reflection. The specular reflection represents that the incident angle of the light ray is the same as the angle of reflection of the light ray. The spread reflection occurs on an uneven surface. When the number of angles of reflected light rays exceeds the value, the angles of reflection of some reflected light rays are the same as the incident angle. The diffuse reflection occurs on a rough or uneven surface, and the reflected light rays have different angles.

Because the inner wall surface of the hollow housing 110 does not pertain to a specular surface, stray light L10 may enter the light sensing module 140. The currently used light sensing module 140 includes a CMOS (Complementary Metal Oxide Semiconductor) sensor having the resolution of about 100*100 DPI. The field of view (FOV) of the lens in the CMOS sensor of the light sensing module 140 is about ArcTan(pattern diagonal/2/EFL)*2, wherein EFL is an equivalent focal length of the lens. The light source module 120 is usually a light-emitting diode (LED) for emitting infrared light with the wavelength of about 800 to 950 nm. A lens fixing structure of the light sensing module 140 may adjust the image acquiring distance from the lens to the object 102. The illumination effect of the optical head 101 on the object 102 is controlled by adjusting the lens fixing structure of the light sensing module 140, designing the reflection property of the inner wall surface of the hollow housing 110 and adjusting the position of the light source module 120.

For example, the resolution of the lens is about 50 to 80 lp/mm, wherein RI>80%, and the f-number (F/N) cannot be too high to increase the illumination loading. The allowable tilt angle of the optical head for reading the object has to reach 30 to 40 degrees, and the depth of field of the lens is greater than ±0.7 mm. The object 102 may be an E-book on which two-dimensional bar code patterns are printed. Because the surface material of the sheet of the e-book can easily reflect light and the tilt angle A between the optical head and the surface of the sheet may reach 0 to 30 degrees or even 0 to 40 degrees when the user holds the optical head to read the e-book. Thus, it is necessary to prevent the strong light reflected by the surface of the sheet from entering the light sensing module 140 so that the object cannot be recognized.

In FIG. 1, the light ray outputted from the light source module 120 of the LED, for example, impinges on the inner wall surface of the hollow housing 110 of the conical pen head to increase the intensity of the incident light. However, there is the reflected light that still can enter the light sensing module 140 when the incident angle is equal to 24 degrees. In addition, the inner wall surface (typically referred to as a reflective shell) having the reflecting effect also makes the stray light travel back to the light sensing module 140 so that the contrast is further decreased.

FIG. 2 is a schematic illustration showing application of another conventional optical head. As shown in FIG. 2, the optical head is similar to that of FIG. 1 except that the light ray of a LED 120 directly illuminates the object 102. Such a condition tends to make the reflected light enter the light sensing module 140 so that the contrast is further decreased.

Consequently, the drawback of the conventional optical head is that the dead spots of recognition caused by the reflected strong light cannot be eliminated so that the illumination efficiency cannot be effectively increased, the usage and power consumption of the LED cannot be decreased, and the allowable range of the tilt angle cannot be effectively broadened. In addition, the fabrication of the conventional optical head is also very complicated.

SUMMARY OF THE INVENTION

It is therefore an object of the invention to provide an optical head that can be easily assembled, can eliminate the dead spot of recognition caused by the strong reflected light, can enhance the illumination efficiency to reduce the number and the power consumption of light sources, and can enhance the illumination uniformity to enhance the allowable range of a tilt angle.

To achieve the above-identified object, the invention provides an optical head, which can be easily assembled and is for reading an image of an object. The optical head includes a housing, a diffuser, a light source module and a light sensing module. The diffuser is connected to the housing. The light source module has a substrate and a first light source mounted on a front side of the substrate. The front side of the substrate is fixed to an external surface of the diffuser. The first light source provides an initial light ray incident to the diffuser, and the diffuser processes the initial light ray into uniform light for output. The light sensing module fixed in the housing is for sensing reflected light generated from the uniform light reflected by the object.

Thus, the size of the optical head can be significantly reduced so that the user can carry the optical head conveniently. In addition, the light source may be disposed at a location very close to the to-be-measured object, and most light rays outputted from the light source may be incident to the diffuser substantially vertically, so the illumination efficiency and the recognition ability can be effectively enhanced. Furthermore, the LED may be directly bonded to the flexible circuit board so that the so-called surface mount LED is obtained and the light source module may be mounted more simply because the flexible circuit board only needs to surround the diffuser over 360 degrees. Thus, the optical head can be easily assembled.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
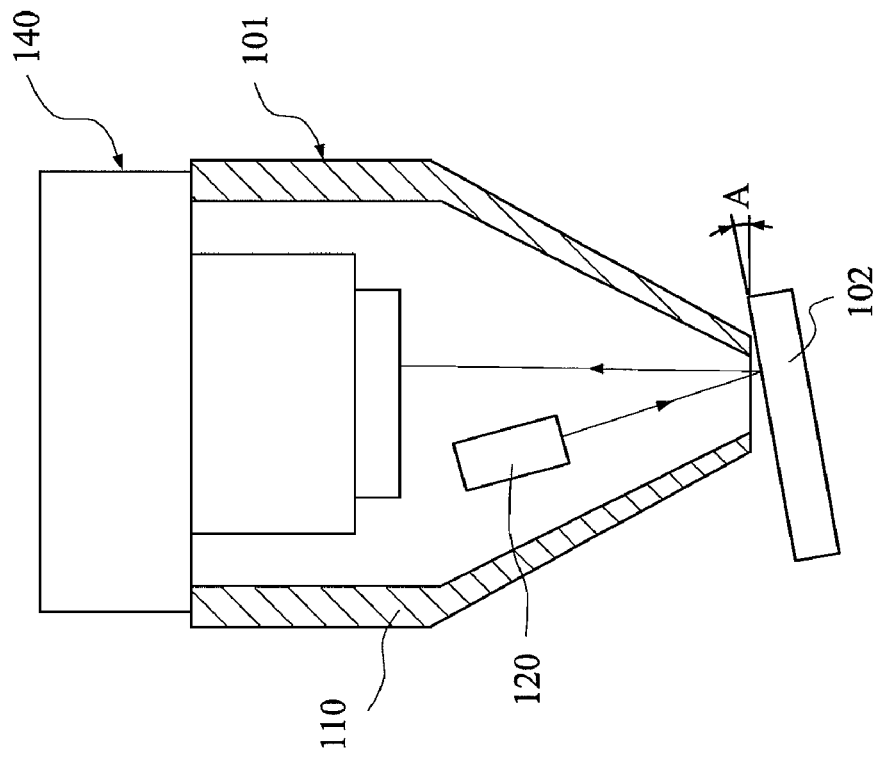
FIG. 1 is a schematic illustration showing application of a conventional optical head.
Figure 2:
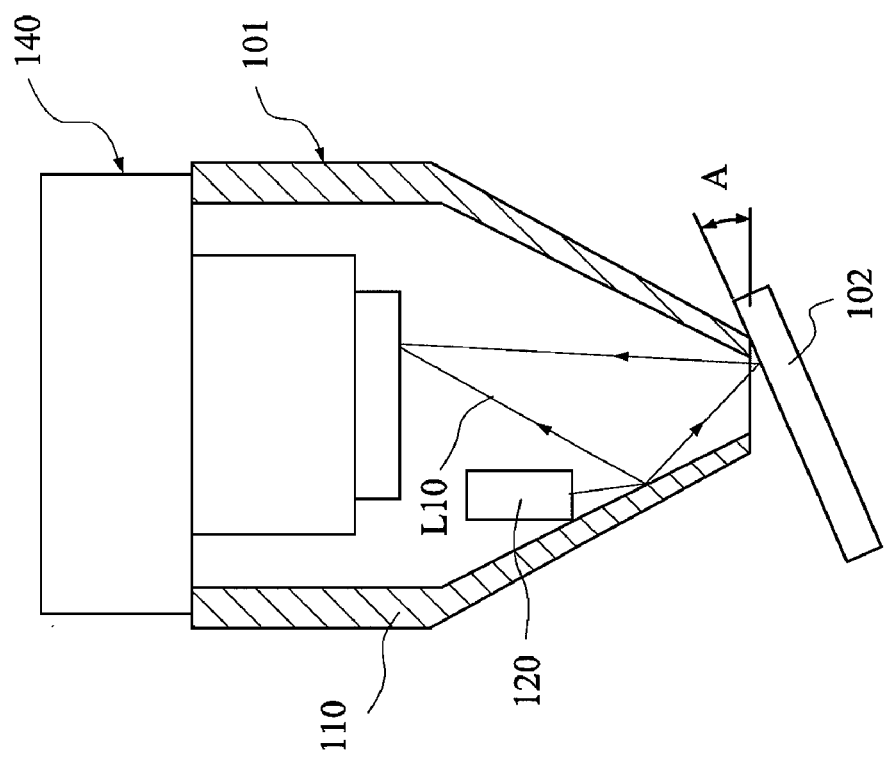
FIG. 2 is a schematic illustration showing application of another conventional optical head.
Figure 3:
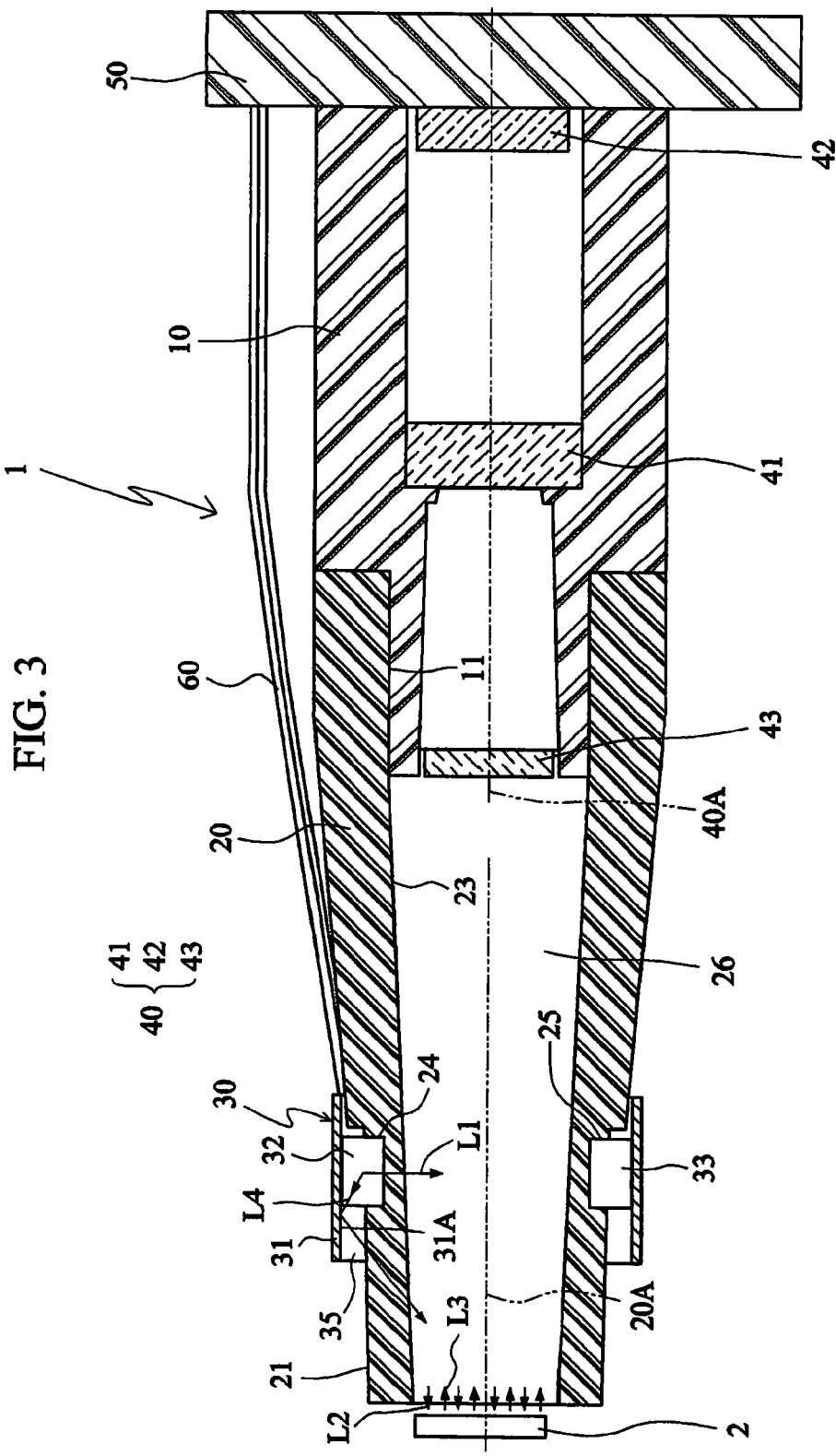
FIG. 3 is a schematic illustration showing application of an optical head according to a first embodiment of the invention.

FIG. 3 is a schematic illustration showing application of an optical head 1 according to a first embodiment of the invention. Referring to FIG. 3, the optical head 1 of this embodiment is for reading an image of an object 2. The object 2 may be, for example, an e-book, on which patterns of two-dimensional bar codes are printed. The optical head 1 includes a housing 10, a diffuser 20, a light source module 30 and a light sensing module 40.

The diffuser 20 is directly connected to the housing 10 and has a chamber 26. In FIG. 3, the diffuser 20 may be a hollow body or a hollow tube and may serve as a light integrating sphere. However, the diffuser 20 may also be a solid body or a solid cylinder. The diffuser 20 may have a circular cross-sectional shape, a rectangular cross-sectional shape or other cross-sectional shapes. When the diffuser 20 has the circular cross-sectional area, a substrate 31 surrounds the diffuser 20. However, the invention is not limited thereto. The substrate 31 may also surround the diffuser 20 by an angle smaller than 360 degrees. For example, the substrate 31 may surround the diffuser 20 by an angle smaller than 180 degrees or ranging between 180 and 360 degrees.

The light source module 30 has the substrate 31 and a first light source 32 mounted to a front side 31A of the substrate 31. The front side 31A of the substrate 31 is fixed to an external surface 21 of the diffuser 20, the first light source 32 provides an initial light ray L1 incident to the diffuser 20, and the diffuser 20 receives the initial light ray L1 and processes the initial light ray L1 into uniform light L2 for output in an axial direction 20A of the diffuser 20, wherein the initial light ray L1 is reflected many times in the diffuser 20 to form the uniform light L2. Alternatively, the initial light ray L1 may also be reflected and refracted many times in the diffuser 20 to form the uniform light L2.

The light sensing module 40 fixed in the housing 10 senses reflected light L3, which is generated from the uniform light L2 reflected by the object 2 disposed outside the diffuser 20. The reflected light L3 enters the chamber 26 of the diffuser 20 in a direction opposite the direction of the uniform light L2, and the light source module 30 is entirely disposed outside the chamber 26 so that the initial light ray L1 is transmitted through the diffuser 20 and enters the chamber 26. An optical axis 40A of the light sensing module 40 is substantially parallel to the axial direction 20A of the diffuser 20.

The substrate 31 is a flexible circuit board, the first light source 32 is electrically connected to the flexible circuit board, and the flexible circuit board is electrically connected to a mainboard 50 of the optical head 1 via wires 60. The first light source 32 may be a light-emitting diode (LED). The mainboard 50 is formed with a plurality of electrical elements, which constitutes a processing circuit. After the optical head 1 has read the pattern on the object 2, the processing circuit on the mainboard 50 may directly recognize this pattern and output a signal corresponding to the pattern. For example, the sound or light ray may be outputted to interact with the user.

In order to provide the brighter uniform light, the light source module 30 may further have a second light source 33, which is mounted on the substrate 31 and electrically connected to the substrate 31. The second light source 33 may also be a LED. The LEDs 32 and 33 may be accommodated within grooves 24 and 25 of the diffuser 20 so that most light rays may be incident to the diffuser 20 vertically. In another example, the second light source 33 may be mounted on another substrate. Therefore, the light source module 30 includes, without limitation to, one LED or multiple LEDs. The LEDs may output the same light ray or different light rays.

The light sensing module 40 includes a lens 41 and an image sensor 42. The lens 41 is fixed in the housing 10. The image sensor 42 is fixed in the housing 10 through the mainboard 50, and receives the reflected light L3 through the lens 41.

In order to filter out the infrared light outputted from the first light source and the second light source, the light sensing module 40 may further include an infrared filter 43, fixed in the housing 10, for filtering the infrared light of the reflected light L3.

In order to facilitate the adjustment of focusing, the diffuser 20 may be configured such that its inner wall 23 may slide or move relatively to an outer wall 11 of the housing 10. Alternatively, the inner wall 23 and the outer wall 11 may be formed with corresponding threads to facilitate the adjustment.

In this embodiment, the front side 31A of the substrate 31 is fixed to the external surface 21 of the diffuser 20 through an adhesive 35. In addition, the front side 31A of the substrate 31 reflects a secondary light ray L4, which is not directly incident to the diffuser 20 and is outputted from the first light source 32, to the diffuser 20.

Figure 4:
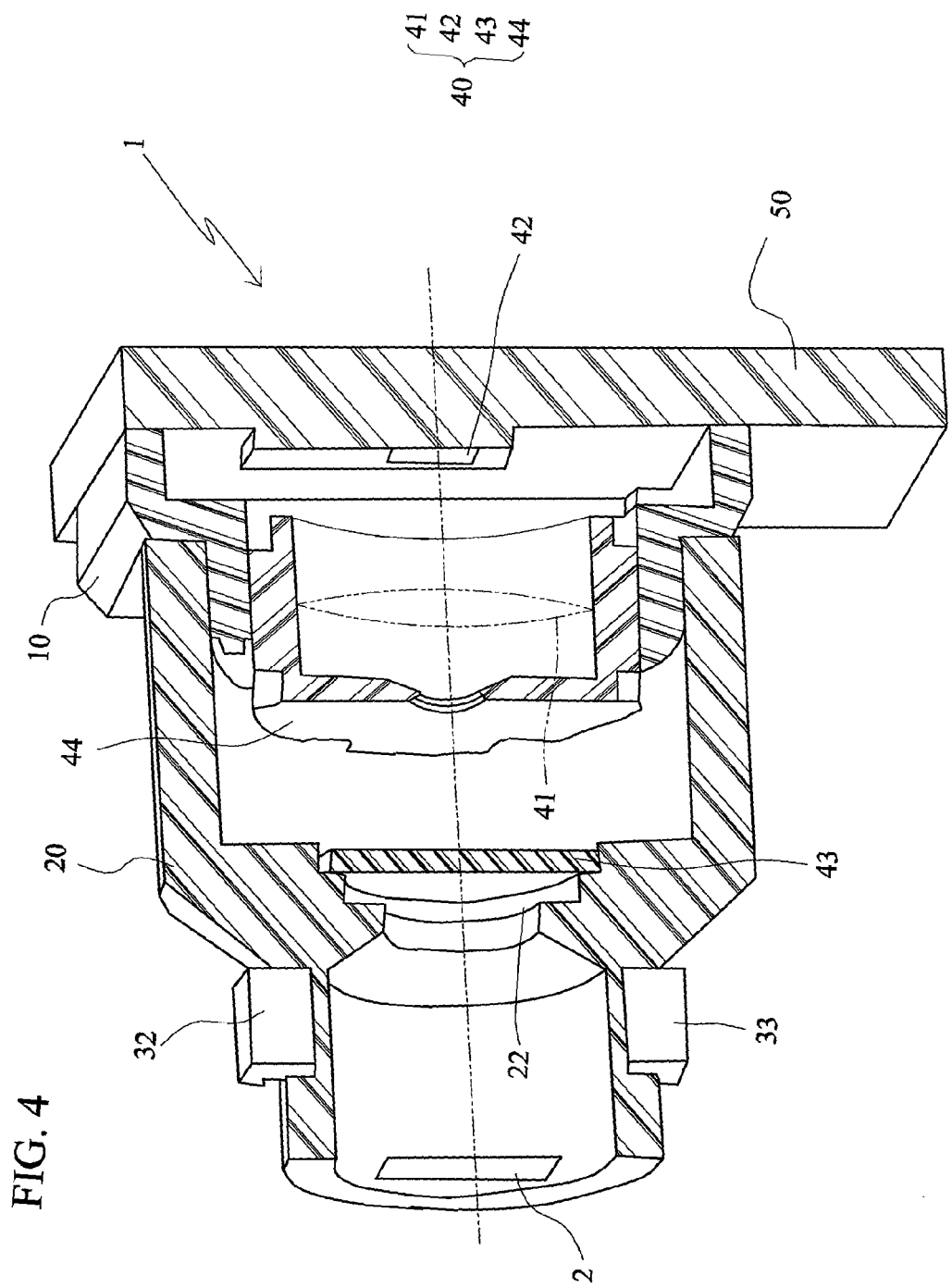
FIG. 4 is a schematic illustration showing application of an optical head according to a second embodiment of the invention.

FIG. 4 is a schematic illustration showing application of an optical head according to a second embodiment of the invention. In order to facilitate the clear illustration, the substrate and the adhesive are not shown in FIG. 4. As shown in FIG. 4, this embodiment is similar to the first embodiment except that the diffuser 20 has a stray light eliminating sector 22 for preventing the stray light from entering the light sensing module 40. The stray light eliminating sector 22 is usually configured to have a cone-like shape to prevent the stray light from entering the light sensing module 40.

In addition, the light sensing module 40 of this embodiment includes a lens barrel 44, a lens 41 and an image sensor 42. Similarly, the light sensing module 40 may further include an infrared filter 43. The lens barrel 44 is fixed in the housing 10. The lens 41 is fixed in the lens barrel 44. The image sensor 42 is fixed in the housing 10 and receives the reflected light L3 through the lens 41.

Consequently, it is obtained that the length of the optical head 1 of this embodiment may be effectively shortened. The equivalent focal length (EFL) of the lens in the conventional optical head is greater than or equal to 5 millimeters. However, the EFL of the lens 41 of the optical head of this invention can be smaller than or equal to 3 millimeters.

According to the embodiments of the invention, the size of the optical head can be significantly reduced so that the user can carry the optical head conveniently. In addition, the light source may be disposed at a location very close to the to-be-measured object, and most light rays outputted from the light source may be incident to the diffuser substantially vertically, so the illumination efficiency and the recognition ability can be effectively enhanced. Furthermore, the LED may be directly bonded to the flexible circuit board so that the so-called surface mount LED is obtained and the light source module may be mounted more simply because the flexible circuit board only needs to surround the diffuser over 360 degrees. Thus, the optical head can be easily assembled.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. An optical head for reading an image of an object, the optical head comprising:
   a housing;
   a diffuser, connected to the housing, the diffuser having a chamber;
   a light source module, having a substrate and a first light source mounted on a front side of the substrate, wherein the front side of the substrate is fixed to an external surface of the diffuser, the substrate is a flexible circuit board, the first light source is connected to the flexible circuit board, the first light source provides an initial light ray incident to the diffuser, and the diffuser processes the initial light ray into uniform light for output in an axial direction of the diffuser; and
   a light sensing module, fixed in the housing, for sensing reflected light generated from the uniform light reflected by the object disposed outside the diffuser, wherein the reflected light enters the chamber of the diffuser in a direction opposite the direction of the uniform light, and the light source module is entirely disposed outside the chamber so that the initial light ray is transmitted through the diffuser and enters the chamber.

2. The optical head according to claim 1, wherein an optical axis of the light sensing module is parallel to the axial direction of the diffuser.

3. The optical head according to claim 1, wherein the substrate surrounds the diffuser.

4. The optical head according to claim 1, wherein the first light source is a light-emitting diode (LED).

5. The optical head according to claim 1, wherein the light source module further has a second light source, which is mounted on the substrate and electrically connected to the substrate.

6. The optical head according to claim 5, wherein the substrate surrounds the diffuser.

7. The optical head according to claim 5, wherein the first light source and the second light source are light-emitting diodes (LEDs).

8. The optical head according to claim 1, wherein the diffuser is a hollow tube.

9. The optical head according to claim 1, wherein the diffuser is movable relative to the housing.

10. The optical head according to claim 9, wherein the diffuser and the housing are movable relative to each other through threads.

11. The optical head according to claim 1, wherein the front side of the substrate is fixed to the external surface of the diffuser through an adhesive.

12. The optical head according to claim 1, wherein the front side of the substrate reflects a secondary light ray, which is not directly incident to the diffuser and is outputted from the first light source, into the diffuser.

13. The optical head according to claim 1, wherein the light sensing module comprises:
   a lens, fixed in the housing; and
   an image sensor, fixed in the housing, for receiving the reflected light through the lens.

14. The optical head according to claim 13, wherein the light sensing module further comprises:
   an infrared filter, fixed in the housing, for filtering infrared light of the reflected light.

15. The optical head according to claim 13, wherein the diffuser has a stray light eliminating sector for preventing stray light from entering the light sensing module.

16. The optical head according to claim 1, wherein the light sensing module comprises:
   a lens barrel, fixed in the housing;
   a lens, fixed in the lens barrel; and
   an image sensor, fixed in the housing, for receiving the reflected light through the lens.

17. The optical head according to claim 16, wherein an equivalent focal length of the lens is smaller than or equal to 3 millimeters.

18. An optical head for reading an image of an object, the optical head comprising:
   a housing;
   diffusing means, connected to the housing, for diffusing light, the diffusing means having a chamber;
   a light source module, having a substrate, a first light source mounted on a front side of the substrate, and a second light source mounted on the substrate and electrically connected to the substrate, wherein the front side of the substrate is fixed to an external surface of the diffusing means, the first light source provides an initial light ray incident to the diffusing means, the diffusing means processes the initial light ray into uniform light for output in an axial direction of the diffusing means; and
   sensing means, fixed in the housing, for sensing reflected light generated from the uniform light reflected by the object disposed outside the housing, wherein the reflected light enters the chamber of the diffusing means in a direction opposite the direction of the uniform light, the light source module is entirely disposed outside the chamber so that the initial light ray is transmitted through the diffusing means and enters the chamber, the sensing means comprises a lens fixed in the housing, an image sensor, fixed in the housing, for receiving the reflected light through the lens, and an infrared filter, fixed in the housing, for filtering infrared light of the reflected light.

19. The optical head according to claim 18, wherein the diffusing means has means for preventing stray light from entering the sensing means.

* * * * *